United States Patent Office 3,409,039
Patented Nov. 5, 1968

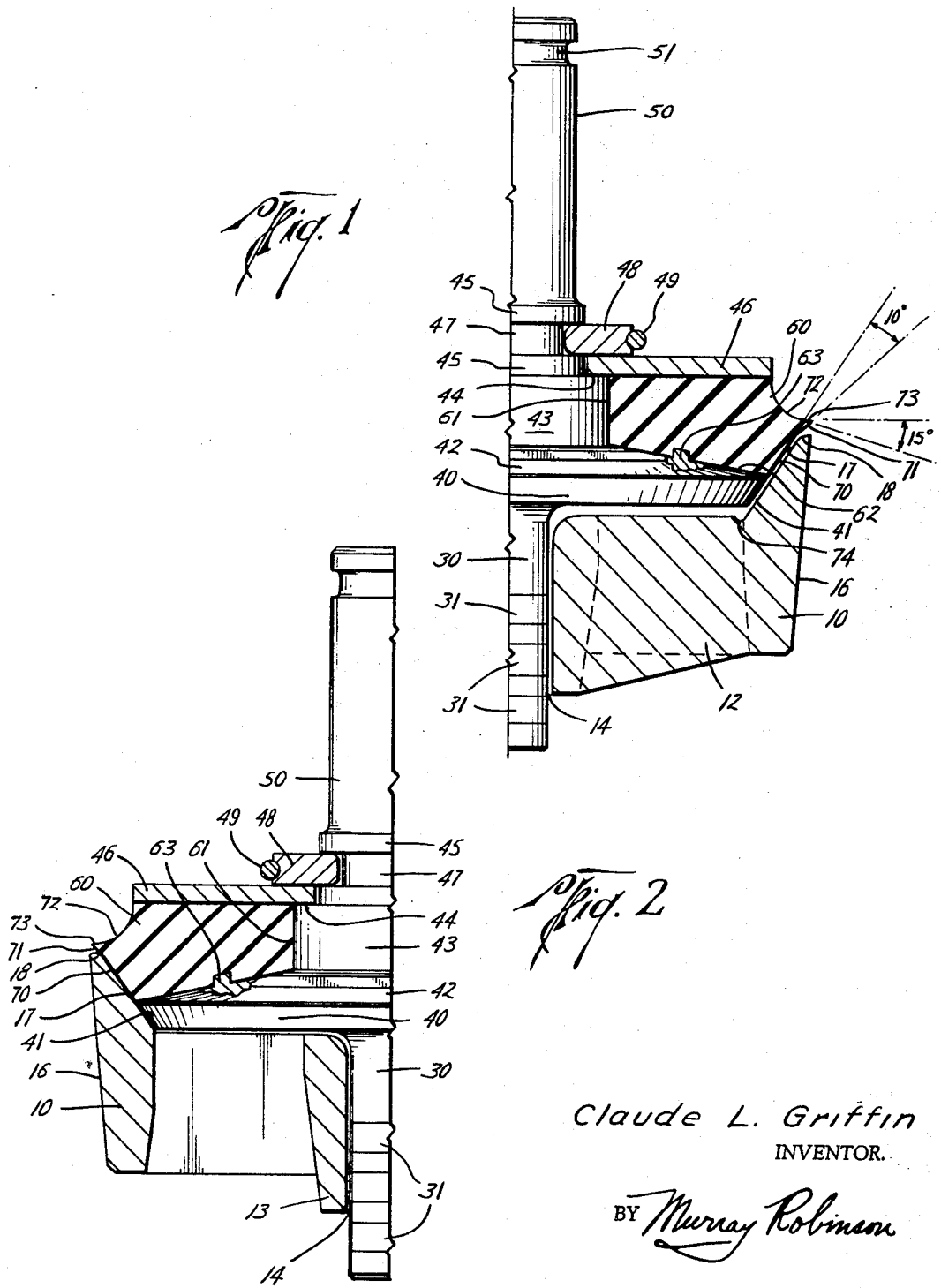

3,409,039
VALVE MEMBER HAVING CONICALLY TAPERED SEATING SURFACE
Claude L. Griffin, South Houston, Tex., assignor, by mesne assignments, to G. W. Murphy Industries, Inc., Houston, Tex., a corporation of Texas
Continuation of application Ser. No. 74,068, Dec. 6, 1960, which is a continuation of application Ser. No. 707,219, Jan. 6, 1958. This application Apr. 22, 1963, Ser. No. 274,768
16 Claims. (Cl. 137—516.29)

ABSTRACT OF THE DISCLOSURE

Slush pump valve includes a seat ring having a conically tapered seat with a rounded upper edge and a valve closure of sandwich type including a metal base plate at bottom and a metal pressure plate on top between which a rubber seal ring is retained under pressure. Outer periphery of base plate and lower part of outer periphery of seal ring have same taper as seat. Upperpart of seal ring has greater taper than seat and overlies rounded upper edge of seat and contacts rounded edge initially on closure to cushion closure and wipes seat to insure a seal even on a dry seat.

---

This application is a continuation of my prior copending application Ser. No. 74,068, filed Dec. 6, 1960, now abandoned, which was a continuation of and copending with my original application Ser. No. 707,219 filed Jan. 6, 1958, now abandoned.

This application pertains to valves and more particularly to valves for slush pumps such as are used in connection with oil well drilling.

According to the invention the pump body is provided at its inlets and outlets with valve seat rings forming conically tapered seats with flow passages axially therethrough. Each seat ring is rounded off slightly at the upper edge of the conical seat. The valve member cooperating with each seat ring includes a metal base plate having a tapered outer periphery correlative to the valve seat, and on top of the base plate is disposed a ring of resilient sealing material whose outer periphery is tapered at the lower portion thereof correlative to the seat taper and in alignment with the taper of the base plate while the upper portion thereof tapers at a greater angle. When the valve closes the upper portion of the sealing material ring contacts the seat ring first and deforms gradually to conform to the seat ring taper as the valve moves farther down into the seat ring to come to rest with the base plate in contact with the seat ring.

This causes a gradual reduction of valve velocity as it closes and prevents the valve from being damaged by sudden impacts.

Also, the upper part of the sealing ring wipes the valve seat as the valve closes, insuring a good seal even on a dry pump seat.

Since all the sealing and seating is done on one smooth continuous regularly shaped seating surface, and since the difference in taper angles between the upper and lower portions of the seal ring is not large, there is no disruption of the sealing ring at the juncture of the differently tapered portions thereof.

The construction is inexpensive to manufacture, repair, and maintain.

Other objects and advantages of the construction will become apparent from the following description of a preferred embodiment of the invention wherein:

FIGURE 1 is a vertical axial section through a valve embodying the invention showing same in open position, only the right hand half of the valve being shown, and FIGURE 2 is a similar view of the left hand half of the valve showing same in closed position.

Referring now in both FIGURE 1 and FIGURE 2, the valve comprises a metal seat ring 10 having an axial flow passage therethrough. Three webs 12 project radially inward from the flow passage wall to support a valve stem guide bearing 13 having an axial opening 14 therethrough. The outer periphery 16 of the seat ring is tapered to facilitate its positioning in the pump body (not shown). The upper end of the valve seat ring around the flow passage is tapered conically to provide an upwardly flaring seat 17. The upper edge 18 of the seat is rounded.

The valve member cooperating with the valve seat ring comprises a metal body having a guide stem 30. Stem 30 fits within the guide stem bearing and is provided with a plurality of rubber rings 31 set in annular grooves therearound so as to be substantially flush with the outer surface of the stem. These rings reduce the rate of guide stem wear.

A base plate or flange 40 extends out from the valve body above the guide stem. The lower face of the base plate is flat and lies in a plane perpendicular to the valve axis so as to overlie the tops of the webs 12 but not normally touch them. The outer periphery 41 of the base plate flares upwardly, being tapered conically correlative to the seat taper. The upper surface 42 of the base plate is conically tapered, converging upwardly toward a cylindrical hub 43. There is an an annular rib 63 projecting upwardly from the base plate.

The hub 43 terminates at a shoulder 44 where the body diameter reduces to provide a centering portion 45 for a top plate or pressure plate 46 which is positioned therearound. A further reduced diameter portion 47 midway of centering portion 45 forms an annular groove receiving C shaped clamps 48 held together by snap ring 49.

At the upper end of the valve member is an upper valve stem 50 around which a biasing spring (not shown) may be placed and held in position by a fastening means (not shown) cooperating with annular groove 51. Held between base plate 40 and pressure plate 46 is a seal ring 60 which has a center opening 61 fitting around hub 43. The lower face 62 of the seal ring is conically dished, i.e. tapered, converging upwardly, correlative to the tapered upper surface of the base plate. An annular groove in the lower face 62 cooperates with rib 63 on the upper surface of the valve plate to provide interlocking means for retaining the seal ring on the base plate against outward motion. The upper face of the seal ring is flat, lying in a plane perpendicular to the valve axis. The relaxed thickness of the seal ring is slightly greater than the space between the pressure plate and base plate so as to place the seal ring under pressure when assembled so as to avoid any leakage past the hub.

The outer periphery of the seal ring includes a lower seating portion 70 conically tapered at the same angle as the peripheral surface 41 of the base plate and in line therewith to form a continuation of the conical surface thereof. A bulge at the juncture of the base plate and seal ring, e.g. due to compression of the ring during assembly, is preferably avoided, since such a bulge might contact the valve seat first. The lower portion of the outer periphery of the seal ring, together with the outer periphery of the base plate, should be formed correlative to the valve seat.

Adjacent and above the lower peripheral portion 70 of the seal ring is upper seating portion 71, which is also conically tapered, but at a greater acute angle to the valve axis than the lower seating portion. The difference in taper angles between the lower and upper seating portions is preferably between 5 and 15 degrees, 10 degrees being a most suitable difference. Smaller differences in taper angle will reduce the wiping and cushioning effect of the upper seating portion while larger differences in taper angle will place undue strain on the seal ring, tending to tear off the upper seating portion or will prevent the lower seating portion from engaging the valve seat at all. The portion of the surface of seat ring 10 lying directly below upper seating portion 71 is hereinafter referred to as the upper end face of the valve seat ring.

Above the upper seating portion of the outer periphery of the seal ring, there is a downwardly flaring portion 72 that is concave in vertical section, providing increased flexibility to the outer tip 73 of the seal ring formed between the upper seating portion of the outer periphery and the lower part of the concave flaring portion. The flaring portion 72 preferably makes an angle of from zero to 30 degrees with the horizontal plane at its juncture with upper seating portion 71, an angle of 15 degrees being most suitable. With a preferred seat taper angle of 35 degrees relative to the axis of the seat ring and the most suitable angles for the upper and lower surfaces of the tip of the seal ring, the included angle of the tip would be 60 degrees. A seat taper angle in the range of 25 to 55 degrees is most suitable.

With a seat taper angle at the large end of the preferred range, i.e., 55 degrees and a difference of taper angles between the upper seating portions also at the large end of the preferred range, i.e. 15 degrees, the taper angle of the upper seating portion will be seventy degrees. It is thus apparent that the preferred taper angle of the upper seating portion is less than 71 degrees.

It is to be noted that the pressure plate has substantially the same outer diameter as the base plate so that in vertical section the tip forms the apex of a triangle whose base line connects the outer peripheries of the pressure plate and base plate.

The angle of the tip forming the apex of the triangle is preferably in the range of 45 to 90 degrees. This construction provides flexibility without such weakness as to make the tip subject to tearing. It is important that the tip have some flexibility in order to allow for displacement of the seal ring material as the valve seats without necessitating too much flow of material which would cause bulging and undue strain at the concave flaring surface of the seal ring, this being the only unsupported surface toward which any flow can take place, for the seal ring is preferably made of a compound of some oil and water resistant natural or synthetic rubber compound having a durometer hardness in the range of 65 to 90, a hardness of 75 being more suitable, and such a material is substantially incompressible and can only flow or flex to allow for reduction of space available.

In operation when the valve closes the lower surface of tip 73 will seat first against rounded edge 18 of the seat ring causing the tip to flex upwardly. The flexure of the tip will continue as the valve closes until the lower surface 71 of the tip is aligned with the valve seat. During this period the tip wipes the valve seat to insure an immediate seal, at the same time cushioning the valve member so as to reduce the impact on final seating, thereby prolonging valve life. The tip also wipes the seat during opening of the valve.

It may be added that during the life of the valve the seat may wear away adjacent the metal base plate, permitting the valve to move further down. This motion is ultimately limited by the base plate contacting the tops of the webs 12. The seal ring should be replaced before this occurs, but such limitation limits the degree of distortion to which the seal ring, or "valve insert" as it is usually known, is subjected. The grooves 74 across the tops of the webs 12 at their junctures with the valve seat provide for ease in machining and also serve as trash receptors to prevent sand or the like washed down from the valve seat during the wiping action from building up on the webs to such a degree as to prevent closure.

Whenever the seal ring becomes unduly worn, it can of course be easily replaced by removing the snap ring and C clamps and pressure plate. When a new seal ring is put on an old worn valve body, it may extend out beyond the line of the tapered portion of the base plate.

While a preferred embodiment of the invention has been shown and described, many modifications thereof can be made by one skilled in the art without departing from the spirit of the invention and it is intended to cover by Letters Patent all forms of the invention falling within the scope of the following claims.

I claim:

1. A valve insert comprising a ring of resilient sealing material having a lower peripheral tapered seating surface and an upper peripheral tapered seating surface whose taper angle is greater than that of said lower seating surface, said ring being adapted for cooperation with a conically tapered metal valve seat having the same taper angle as said lower seating portion, said ring being made of elastomeric material having a durometer hardness in the range of 65–90, said seating surfaces being conical with straight line cross-sections, said ring being adapted for disposition between a metal base plate therebelow having a conically tapered outer periphery and a metal top plate thereabove, said ring including a portion extending above the upper edge of said upper sealing portion for engagement with such upper plate.

2. The combination of claim 1 in which the difference in taper angles lies in the range of five degrees to fifteen degrees, and the upper seating surface makes an angle with the ring axis of less than 71 degrees.

3. The combination of claim 1 in which the difference in taper angles is substantially ten degrees.

4. The combination of claim 1 in which the seal ring has a downwardly flaring surface above and adjacent said upper seating surface and forming therebetween an annular tip.

5. The combination of claim 4 in which the interior angle of the tip is in the range of forty-five to ninety degrees.

6. The combination of claim 4 in which the interior angle of the tip is substantially sixty degrees and the downwardly flaring surface is concave in vertical section.

7. A valve comprising a seat ring having a conically tapered seat, and a valve member cooperable therewith including a base plate, a pressure plate, and a seal ring therebetween, said seal ring being composed of rubber compound having a durometer hardness in the range of 65 to 90, said base plate having a peripheral seating portion tapered correlative to said seat, said seal ring having a lower peripheral tapered seating portion forming a continuation of said seat portion of the base plate, said seal ring having an upper tapered seating portion adjacent and above said lower seating portion and having a greater taper angle than the seat, the upper edge of said seat being rounded, said upper seating portion of the seal ring overlying said rounded edge, said seat taper angle relative to the seat axis lying in the range of 25 to 45 degrees, the difference in taper angles of said upper and lower seating portions of the seal ring being in the range of 5 to 15 degrees, said seal ring having a downwardly flaring surface above and adjacent said upper seating portion forming an annular flexible tip therebetween, the interior angle of said tip being in the range of 45 to 90 degrees, said downwardly flaring surface being concave in vertical section.

8. A seal ring adapted for use with a valve including a seat ring having a conically tapered seat and a valve member cooperable therewith adapted to carry the seal ring with its outer periphery in position to engage the seat, said seal ring being made of elastomeric material having a durometer hardness in the range of 65–90,
said seal ring outer periphery having a lower conically tapered seating surface having a straight line cross section adapted to engage a correlatively tapered seat ring seat, characterized by the fact that said seal ring includes:

a conically tapered seating surface at its upper periphery adjoining said lower seating surface, said upper seating surface having a straight line cross section, said conically tapered upper seating surface having a greater taper angle relative to the axis of the ring than said lower seating surface, an upwardly converging surface above and adjacent said upper seating surface forming therebetween an annular tip having an included angle between 45 and 90 degrees, the difference in taper angle between said upper and lower seating surfaces being in the range of five degrees to fifteen degrees facilitating flow of said upper seating surface into alignment with said lower seating surface to engage the same conically tapered seat.

9. A seal ring adapted for use with a valve including a seat ring having a conically tapered seat and a valve member cooperable therewith adapted to carry the seal ring with its outer periphery in position to engage the seat, said seal ring being made of elastomeric material having a durometer hardness in the range of 65–90, said seal ring outer periphery having a lower conically tapered seating surface having a straight line cross section adapted to engage a correlatively tapered seat ring seat, characterized by the fact that said seal ring includes:

a conically tapered seating surface at its upper periphery adjoining said lower seating surface, said upper seating surface having a straight line cross section, all lines passing through the axis of said ring that are tangent to the surface of the portion of said ring immediately above and adjacent to said upper seating surface will pass through a portion of said elastomeric material, said conically tapered upper seating surface having a greater taper angle relative to the axis of the ring than said lower seating surface, the difference in taper angle between said upper and lower seating surfaces being in the range of five degrees to fifteen degrees facilitating flexure of said upper seating surface into alignment with said lower seating surface to engage the same conically tapered seat, said conically tapered upper seating surface having a taper angle less than 71 degrees relative to the axis of the ring, whereby said conically tapered upper seating surface is adapted to make the initial valve closing contact with the seat of a seat ring having a conically tapered seat.

10. A valve closure comprising a metal base plate having an upwardly flaring conical outer periphery, an elastomeric annular valve insert on top of said plate, a metal top plate on top of said insert, the lower portion of said insert adjacent said base plate having a conically tapered outer periphery having the same taper angle as said base plate outer periphery, the middle portion of said insert adjacent said lower portion having a conically tapered outer periphery of somewhat greater taper angle than said outer periphery of said lower portion, the upper portion of said insert between said top plate and said middle portion being of less diameter of said middle portion and providing a body into which the elastomeric material of the middle portion can flow to allow the outer periphery of the middle portion to contract to the same taper angle as the outer periphery of the lower portion.

11. In combination, a pump valve element and a seat element each of rigid material and each having a pressure end and said elements including mutually-mating frustoconical seating faces tapering with increasing diameter toward the pressure end of each element, one of said elements having an annular groove adjacent its seating face and opposite the seating face of the other element and located near its pressure end when said faces are engaged; a sealing member of resilient material filling said groove flush with the associated face and having an annular bead extending therebeyond toward the seating face of the other element, the other element including a transverse surface at its pressure end and the bead including enough resilient material that when deformed by the mating of said faces the material will extrude out and partly overlie the transverse surface of said other element.

12. In the combination set forth in claim 11, the valve element having a transverse pressure face at its pressure end and said annular groove being located between its seating face and its pressure face; and said resilient sealing member having a transverse portion at least partly overlying said pressure face.

13. In the combination set forth in claim 12, a ring of rigid material overlying at least part of said transverse portion of the sealing member; and securing means fixing the ring to the body at the pressure face thereof.

14. In the combination set forth in claim 11, said resilient sealing member comprising rubber-like material secured to the surface of the associated member.

15. A valve comprising a metal seat ring having a conically tapered seat and a valve member cooperable with said seat ring including a metal base plate having an outer peripheral conically tapered seating surface correlative to the lower portion of said seat, the taper of said seating surface being the same as that of said seat, said valve member further including a seal ring mounted on said base plate, said seal ring being made of elastomeric material, said seal ring having a lower conically tapered seating portion adjacent to and overlying a medial portion of said conically tapered seat and an upper conically tapered seating portion adjacent to and overlying the upper part of said conically tapered seat, said upper seating portion having a greater taper angle relative to the axis of the seal ring than said lower seating portion, the difference in taper angle between said upper and lower seating portions being in the range of five to fifteen degrees, the improvement according to which said upper seating portion projects radially outwardly beyond the cone defined by the geometrical projection of said tapered seating surface of the base plate whereby said upper seating portion contacts said seat prior to contact thereof by said lower seating portion of said seal ring and by said seating surface of said base plate upon downward travel of said valve member coaxial with said seat, the portion of said seal ring overlying said upper seating portion being free to flex upwardly upon contact of said upper seating portion with said seat to conform the taper angle of said upper seating portion with that of said seat and said seating surface of the base plate whereby said seating surface of said base plate can then move into engagement with said seat upon continuation of said downward travel of said valve member, said lower seating portion having the same taper angle as said seating surface of said base plate and said seat, no part of said lower seating portion lying inside the cone defined by the geometrical continuation of said conical seating surface of said base plate, whereby said lower seating portion moves into engagement with said seat no later than the time of engagement of said seat by said seating surface of said base plate.

16. A valve comprising
a metal ring having
  a conically tapered seat and
  an upper end face,
a valve member cooperable with said seat ring including
  a seal ring,
  said seal ring being made of elastomeric material,
  said seal ring having a lower peripheral conically tapered seating portion adjacent a portion of said conically tapered seat for engagement therewith and correlative thereto, said lower seating portion having the same taper angle as said seat, characterized by the fact that said seal ring includes:
    a conically tapered upper peripheral seating portion adjoining said lower seating portion,
    said upper seating portion overlying said upper end face for engagement with said upper end face,
    said conically tapered upper seating portion having a greater taper angle relative to the axis of the seal ring than said lower seating portion,
    the taper angle of said upper seating portion being no greater than 70 degrees leaving at least a 20 degree angle between said upper seating portion and a horizontal plane perpendicular to the axis of the seat ring,
    the difference in taper angle between said upper seating portion and said lower seating portion being less than said angle between said upper seating portion and said horizontal plane.

References Cited

UNITED STATES PATENTS

| | | | |
|---|---|---|---|
| 2,011,547 | 8/1935 | Campbell | 137—516.29 |
| 2,148,850 | 2/1939 | Deakins | 251—357 X |
| 2,768,643 | 10/1956 | Acomb | 251—368 X |
| 2,900,999 | 8/1959 | Courtot | 137—516.25 |
| 2,930,401 | 3/1960 | Cowan | 137—540 |
| 2,977,974 | 4/1961 | Browne | 137—243 |

FOREIGN PATENTS

| | | |
|---|---|---|
| 27,909 | 12/1908 | Great Britain. |
| 144,437 | 4/1950 | Australia. |

ARNOLD ROSENTHAL, *Primary Examiner.*